US011535717B2

(12) United States Patent
Ushimaru et al.

(10) Patent No.: US 11,535,717 B2
(45) Date of Patent: Dec. 27, 2022

(54) IONIC COMPOSITE MATERIAL INCLUDING LIGNIN SULFONIC ACID AND E-POLYLYSINE AS COMPONENTS

(71) Applicants: JNC CORPORATION, Tokyo (JP); NATIONAL INSTITUTE OF ADVANCED INDUSTRIAL SCIENCE AND TECHNOLOGY, Tokyo (JP)

(72) Inventors: Kazunori Ushimaru, Ibaraki (JP); Tokuma Fukuoka, Ibaraki (JP); Tomotake Morita, Ibaraki (JP)

(73) Assignees: JNC CORPORATION, Tokyo (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 43 days.

(21) Appl. No.: 16/776,524

(22) Filed: Jan. 30, 2020

(65) Prior Publication Data
US 2020/0239644 A1  Jul. 30, 2020

(30) Foreign Application Priority Data
Jan. 30, 2019  (JP) .............................. JP2019-013942

(51) Int. Cl.
*C08H 7/00*  (2011.01)
*C08G 69/36*  (2006.01)

(52) U.S. Cl.
CPC .............. *C08H 6/00* (2013.01); *C08G 69/36* (2013.01)

(58) Field of Classification Search
CPC .... C08H 6/00; C08H 8/00; C07G 1/00; C08L 97/005; C08G 69/36
See application file for complete search history.

(56) References Cited

U.S. PATENT DOCUMENTS

2008/0226565 A1* 9/2008 Huybrechts ............ C07K 14/00 424/49
2014/0005129 A1* 1/2014 Gu ........................... C07G 1/00 514/22
2019/0225808 A1* 7/2019 Naskar ................... C08L 77/00

FOREIGN PATENT DOCUMENTS

| CN | 107950538 A | * | 4/2018 | |
|---|---|---|---|---|
| JP | H11152410 | | 6/1999 | |
| JP | 2006133299 | | 5/2006 | |
| JP | 2018159064 | | 10/2018 | |
| JP | 2019112526 | | 7/2019 | |
| WO | 2013133705 | | 9/2013 | |
| WO | WO-2020016730 A1 | * | 1/2020 | ............... C05G 5/27 |

OTHER PUBLICATIONS

English-language machine translation of CN-107950538-A, obtained from Espacenet on Sep. 3, 2021, 12 pages.*
Xiaoping Shen, et al., "Preparation and comparison of bulk and membrane hydrogels based on Kraft- and ionic-liquid-isolated lignins," Green Chemistry, Jul. 2016, pp. 5607-5620.
Stéphanie Laurichesse, et al., "Chemical modification of lignins: Towards biobased polymers," Progress in Polymer Science, vol. 39, Nov. 2013, pp. 1266-1290.
Youhua Tao, et al., "New chemosynthetic route to linear ε-polylysine," Chemical Science, Jul. 2015, pp. 6385-6391.
Office Action of Japan Counterpart Application, with English translation thereof, dated Jun. 14, 2022, pp. 1-8.

* cited by examiner

*Primary Examiner* — Liam J Heincer
(74) *Attorney, Agent, or Firm* — JCIPRNET

(57) ABSTRACT

There is provided a novel ionic composite material that can be molded into various shapes using lignin sulfonic acid as one of raw materials thereof, and having flexibility and elasticity, to significantly improve the strength and toughness and impart complete biodegradability thereto. It was found that a combination of ε-polylysine (ε-PL) which is a cationic polymer that is produced by microorganisms and lignin sulfonic acid exhibits excellent strength and toughness. In addition, ε-PL used in this technology is a biodegradable polymer that is completely degraded by microorganisms and the like in the environment. Since lignin sulfonic acid is also a biodegradable polymer, it is thought that a complex in which ε-PL and lignin sulfonic acid are mixed in this technology will exhibit complete biodegradability, and more applications thereof can be expected when utilizing the strength, durability, and biodegradability thereof in addition to the improved strength and toughness.

12 Claims, 2 Drawing Sheets

IONIC COMPOSITE MATERIAL INCLUDING LIGNIN SULFONIC ACID AND ε-POLYLYSINE AS COMPONENTS

CROSS-REFERENCE TO RELATED APPLICATION

This application claims the priority benefit of Japanese Application Serial No. 2019-013942, filed on Jan. 30, 2019. The entirety of the above-mentioned patent application is hereby incorporated by reference herein and made a part of this specification.

BACKGROUND

Technical Field

The disclosure relates to an ionic composite material obtained by combining a lignin sulfonic acid which is a wood-derived anionic polymer with an ε-polylysine(Epsilon-polylysine)(hereinafter referred to as ε-polylysine or ε-PL) which is an amino acid-derived cationic polymer.

Description of Related Art

In the related art, in order to effectively utilize plant biomass, attempts have been made to use lignin, one of the main components constituting plants, or its derivatives as a moldable material. For example, a composite of lignin and a polystyrene resin is described in Patent Document 1, and a moldable ionic composite clay composition formed of a lignin sulfonic acid which is a cation exchange type (that is, anionic) polymer and an anion exchange type (that is, cationic) clay mineral is described in Patent Document 2. In addition, Patent Document 3 describes that, in order to provide an electrostatic complex that is formed of a naturally-derived polymer compound and can form an organogel containing an organic solvent, and an organogel formed from the electrostatic complex, an ionic complex having a water content of 2.0 mass % or less and including ε-PL and an anionic surfactant having a sulfonic acid group is provided.

RELATED ART

[Patent Document 1] Japanese Laid-open No. H11-152410
[Patent Document 2] Japanese Laid-open No. 2006-133299
[Patent Document 3] Japanese Laid-open No. 2018-159064
[Non-Patent Document 1] Green Chemistry; 2016; 18(20); 5607-5620
[Non-Patent Document 2] Progress in Polymer Science; 2014; 39(7); 1266-1290
[Non-Patent Document 3] Chemical Science; 2015; 6(11); 6385-6391

The inventors found that an ionic composite material that can be molded into various shapes, and has high elasticity, and an excellent self-healing ability can be obtained from a water-soluble or water-suspendable ionic complex formed by mixing lignin sulfonic acid which is a lignin-derived compound that can be obtained when pulp is produced according to a sulfite process or in a lignin sulfuric acid treatment or the like, and a cationic polymer into a water solvent (Japanese Patent Application No. 2017-246691).

In recent years, the flow of microplastics into the ocean has become a serious problem. In some fields, use of non-biodegradable plastic materials is regulated by laws, and thus materials having biodegradability and mechanical properties equivalent to existing non-biodegradable plastic materials are in great demand. This disclosure relates to a novel ionic composite material that can be molded into various shapes, and has flexibility and elasticity using lignin sulfonic acid described in Japanese Patent Application No. 2017-246691 as one of raw materials, which can significantly improve the strength and toughness and impart complete biodegradability.

When the inventors conducted research regarding Japanese Patent Application No. 2017-246691, it was found that a combination of ε-PL which is a cationic polymer produced by microorganisms and lignin sulfonic acid had better strength and toughness than a combined ionic composite material described in the example in Japanese Patent Application No. 2017-246691.

In addition, the cationic polymer [poly(diallyldimethylammonium chloride)] used in the example in Japanese Patent Application No. 2017-246691 is unlikely to degrade in the environment, but ε-PL used in this technology is a biodegradable polymer that is completely degraded by microorganisms and the like in the environment. Since lignin sulfonic acid is also a biodegradable polymer, it is thought that a complex in which ε-PL and lignin sulfonic acid are mixed in this technology will exhibit complete biodegradability, and more applications thereof can be expected when utilizing the strength, durability, and biodegradability thereof in addition to the improved strength and toughness.

SUMMARY

That is, this application provides the following inventions.
[1] An ionic composite material including lignin sulfonic acid, its derivatives, or its salts, and ε-polylysine, its derivatives, or its salts, wherein the content of water is 3 to 95 weight % of the entire material
[2] The ionic composite material according to [1], wherein the ionic composite material has elasticity.
[3] The ionic composite material according to [1] or [2], wherein the ionic composite material has a self-healing ability.
[4] The ionic composite material according to any one of [1] to [3], wherein a salt of lignin sulfonic acid or a derivative thereof is a metal salt.
[5] The ionic composite material according to [4], wherein the metal salt is selected from the group consisting of sodium salts, calcium salts, and magnesium salts.
[6] The ionic composite material according to any one of [1] to [5], wherein the ε-polylysine has a weight average molecular weight of 500 to 1,000,000.
[7] The ionic composite material according to any one of [1] to [6], wherein the ionic composite material has a sheet form with a thickness of 1 to 10 mm.
[8] A method of producing the ionic composite material according to any one of [1] to [7], the method including:
a process of mixing lignin sulfonic acid, its derivatives, or its salts, and ε-polylysine, its derivatives, or its salts into a solvent to form an ionic complex in the solvent; and a process of removing the solvent from a solution or suspension containing the ionic complex.

[9] The method according to [8],
wherein the process of forming the ionic complex is performed by mixing a solution containing lignin sulfonic acid, its derivatives, or its salts and a solution containing ε-polylysine, its derivatives, or its salts.

[10] The method according to [8] or [9],
wherein the process of removing the solvent is performed by volatilizing the solvent from the solution or suspension containing the ionic complex.

[11] The method according to any one of [8] to [10],
wherein the solvent is water.

[12] The method according to [11],
wherein the process of removing the solvent is performed by introducing the solution or suspension containing the ionic complex into an organic solvent.

[13] A solution or suspension containing an ionic complex formed of lignin sulfonic acid, its derivatives, or its salts, and ε-polylysine, its derivatives, or its salts.

[14] The solution or suspension according to [13],
wherein a solvent is water.

[15] An ionic composite material which is formed of lignin sulfonic acid, its derivatives, or its salts and ε-polylysine, its derivatives, or its salts, and further includes an organic solvent.

DESCRIPTION OF THE EMBODIMENTS

Figure 1:
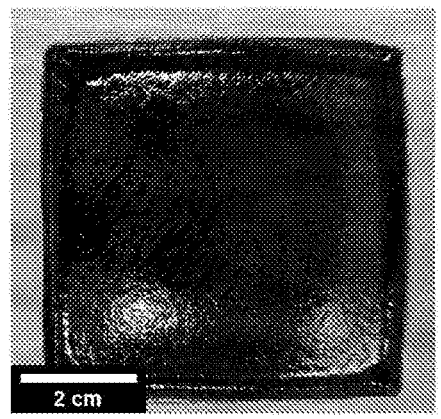
FIG. 1 shows a picture of an appearance of a complex formed of sodium lignin sulfonate and ε-PL.

Specifically, it has been confirmed that, when comparing a sample prepared from lignin sulfonic acid and a cationic polymer at a weight ratio of 1:1, the maximum strength is improved by a factor of 3.1 or more and the toughness is improved by a factor of 2.5 or more compared to a case in which the best maximum strength and toughness are exhibited in the example in Japanese Patent Application No. 2017-246691.

Lignin sulfonic acid is derived from lignin, which is one of the main components constituting a plant together with polysaccharides such as cellulose, and for example, when pulp is produced from plants according to a sulfite process, lignin sulfonic acid is produced as a by-product when lignin is sulfonated. In the embodiments of this disclosure, the lignin sulfonic acid may be lignin sulfonic acid itself produced as a by-product in this manner or a modified lignin sulfonic acid or a partially desulfurized lignin sulfonic acid which is obtained by modifying or partially desulfonating lignin sulfonic acid itself.

Examples of modified lignin sulfonic acids include lignin sulfonic acids in which the content of functional groups is changed by treating lignin sulfonic acid with an acid or an alkali.

A partially desulfurized lignin sulfonic acid is a lignin sulfonic acid in which some of the sulfo groups (—$SO_3H$ or —$SO_3^-$) of the lignin sulfonic acid have been desulfonated. The desulfonation of lignin sulfonic acid in the entire ionic composite material is, for example, a desulfonation of 1% or more sulfo groups among all sulfo groups in the ionic complex material assuming that partial desulfonation has not already been performed.

In the embodiments of this disclosure, lignin sulfonic acid derivatives may be, for example, lignin sulfonic acid derivatives obtained by applying a method of modifying the hydroxyl groups of lignin with polyethylene glycol described in Non-Patent Document 1, lignin sulfonic acid derivatives obtained by applying a method of modifying the hydroxyl groups of lignin with an epoxy-group-containing compound described in Non-Patent Document 2, or lignin sulfonic acid derivatives obtained by applying a method of modifying the phenolic hydroxyl groups of lignin with a fatty acid or aromatic carboxylic acid described in Non-Patent Document 2.

In the embodiments of this disclosure, salts of lignin sulfonic acid or its derivatives are, for example, metal salts, and in consideration of water solubility, the metal salts are, for example, selected from the group consisting of sodium salts, calcium salts, and magnesium salts.

The ε-PL used in the embodiments of this disclosure is not particularly limited, and any of those produced by microorganisms and obtained by chemical synthesis may be used.

The production method using microorganisms is not particularly limited as long as it is a method that can produce ε-PL. For example, a production method using ε-PL-producing bacteria belonging to *Streptomyces alblus* or *Streptomyces noursei* can be used, and ε-PL can be isolated and purified from a culture medium of these bacteria. Regarding production methods using chemical synthesis, for example, ε-PL synthesized using a chemical synthesis method described in Non-Patent Document 3 may be exemplified.

In addition, in the ε-PL, some of the amino groups or carboxyl groups may be chemically modified via a covalent bond or the like.

Examples of chemically modified compounds include compounds obtained by modifying an amino group of ε-PL with a carboxyl-group-containing compound such as carboxylic acid or amino acid via an amide bond, and compounds obtained by modifying a carboxyl group at the terminal of ε-PL with an amino-group-containing compound such as an amine or amino acid via an amide bond or a hydroxyl-group-containing compound such as an alcohol via an ester bond.

In addition, examples of ε-PL derivatives include ε-PL that has been polymerized by dehydrating and condensing ε-PLs.

In addition, in consideration of water solubility, the ε-PL used in the embodiments of this disclosure may be an inorganic acid salt such as a hydrochloride salt of the above cationic polymers or an organic acid salt such as acetate.

The structure of lysine forming ε-PL is not particularly limited, and any of those containing only L-lysine, those containing only D-lysine, and those containing both can be used, for example. In addition, a ratio between L-lysine and D-lysine is not particularly limited.

The degree of polymerization of ε-PL is not particularly limited, and the ε-PL is, for example, a penta- or higher multimer, and the weight average molecular weight thereof may be 500 to 1,000,000, or the weight average molecular weight may be 1,000 to 10,000.

When it is stated that a complex includes "lignin sulfonic acid, its derivatives, or its salts, and ε-PL, its derivatives, or its salts," the complex can further include components other than "lignin sulfonic acid, its derivatives, or its salts, and ε-PL, its derivatives, or its salts." In addition, the composition can also be formed of only "lignin sulfonic acid, its derivatives, or its salts, and ε-PL, its derivatives, or its salts" in one or some exemplary embodiments.

A compositional ratio of lignin sulfonic acid, its derivatives, or its salts, and ε-PL or its salts in the ionic composite material is not particularly limited, and a weight ratio between lignin sulfonic acid and ε-PL may be 1:10 to 10:1 or 1:3 to 3:1. In addition, a proportion of a total amount of lignin sulfonic acid and ε-PL in the entire ionic composite material may be 5 to 97 weight %, 60 to 95 weight %, or 80 to 90 weight % of the entire ionic composite material.

The content of water in the ionic composite material may be 3 to 95 weight %, 5 to 40 weight %, or 10 to 20 weight % of the entire ionic composite material. Within the content of water, the ionic composite material can have elasticity.

The content of water is adjusted when a solution or suspension containing an ionic complex formed of lignin sulfonic acid, its derivatives, or its salts, and ε-PL, its derivatives, or its salts is left in air or under controlled humidity conditions. In this case, vaporization of water may be promoted by performing heating using a thermostatic chamber, a hot plate, or the like. In addition, the above solution or suspension containing an ionic complex may be added dropwise to an organic solvent to obtain precipitates of the complex, and the obtained complex is then left in air or under controlled humidity conditions as necessary, and thus the content of water may be adjusted.

In the embodiments of this disclosure, "having elasticity" refers to a property in which, when a dumbbell-like test piece (No. 8, JIS K 6251) is cut out from a material, a tension is applied to the test piece, the dumbbell-like test piece is deformed to the extent that it does not break, and then the tension is completely removed and the test piece is left for 1 hour, the amount of deformation after being left is 50% or less of the maximum amount of deformation when a tension is applied. The amount of deformation after being left is, for example, an amount of deformation of 30% or less of the maximum amount of deformation when a tension is applied.

In the embodiments of this disclosure, "self-healing ability" refers to a property in which, when a dumbbell-like test piece (No. 8, JIS K 6251) is cut out from a material, cutting is performed using a sharp blade or the like along a line perpendicular to the major axis that passes through the center of the major axis of the test piece, cross sections of the cut test piece are brought into contact with each other immediately after cutting and left for 1 hour, and one of the contact test pieces is then lifted, the breaking strength recovers to the extent that at least the test piece does not break due to its own weight.

Since the ionic composite material of the embodiments of the disclosure is mainly formed of lignin sulfonic acid utilizing wood-derived lignin and ε-PL produced by bacteria, it has low toxicity, and biodegradability.

Examples of a specific method of measuring biodegradability include a dissolved organic carbon (DOC) method and a biochemical oxygen demand (BOD) method. Having biodegradability means that 50% or more of a complex degrades according to culturing.

Low toxicity means that the toxicity is low with respect to mammals and specifically humans. Specifically, low toxicity means that a lethal dose when a compound as a raw material is injected into a rat is 1,000 mg/kg or more.

Biodegradability is a property of being completely degraded due to oxidation or hydrolysis in microorganisms or the environment, and producing only natural by-products (carbon dioxide gas, water, amino acid, methane, biomass, etc.).

The ionic composite material of the embodiments of the disclosure has excellent toughness. Here, the toughness is an index of the toughness of a substance and is represented by an area of a stress-strain curve.

The toughness of the ionic composite material of the embodiments of the disclosure is improved by a factor of 2.5 or more compared to an ionic complex using PDADMAC (polydiallyldimethylammonium chloride) as a cationic polymer.

The ionic composite material of the embodiments of the disclosure can be processed into a sheet form. The thickness of the sheet is not particularly limited, and is, for example, 1 to 10 mm.

Another aspect of the disclosure is a method of producing an ionic complex. Specifically, a method including a process of mixing lignin sulfonic acid, its derivatives, or its salts, and ε-PL, its derivatives, or its salts into a solvent to form an ionic complex in the solvent and a process of removing the solvent from a solution or suspension containing the ionic complex is provided.

That is, the ionic composite material formed of lignin sulfonic acid, its derivatives, or its salts, and ε-PL, its derivatives, or its salts can be prepared, for example, by a method in which lignin sulfonic acid, its derivatives, or its salts and ε-PL, its derivatives, or its salts are mixed into a solvent to form an ionic complex, or a solution containing lignin sulfonic acid, its derivatives, or its salts and a solution containing ε-PL, its derivatives, or its salts are mixed to form an ionic complex, and additionally, the solvent is removed from the solution or suspension containing the ionic complex by volatilization or when the solvent is water, the aqueous solution or water suspension is put into an organic solvent, and thus the ionic complex is precipitated in the organic solvent.

Exemplary examples of the solvent used in the embodiments of this disclosure include water and organic solvents that are miscible with water such as methanol, ethanol, isopropyl alcohol, ethylene glycol, glycerin, polyethylene glycol, formic acid, acetic acid, propionic acid, acetone, acetonitrile, tetrahydrofuran, dimethylsulfoxide, dimethylformamide, and dioxane, and water may be particularly adopted.

Another aspect of the disclosure is a solution or suspension containing an ionic complex formed in a solvent by mixing lignin sulfonic acid, its derivatives, or its salts, and ε-PL, its derivatives, or its salts into the solvent.

The solution or suspension containing the ionic complex can be prepared by, for example, mixing an aqueous solution containing lignin sulfonic acid, its derivatives, or its salts and an aqueous solution containing ε-PL, its derivatives, or its salts or mixing a powder of lignin sulfonic acid, its derivatives, or its salts into an aqueous solution containing ε-PL, its derivatives, or its salts.

In the solution or suspension containing the ionic complex prepared in this manner, the solvent may be volatilized on a flat plate, for example, a Petri dish, and thereby a sheet-like ionic complex can be obtained.

In addition, when the solvent is water, the aqueous solution or water suspension containing the ionic complex prepared in this manner may be added to an organic solvent, and thus the ionic complex can be collected as a precipitate.

When a tensile test is performed on the obtained ionic complex, the maximum stress and elongation at break can be measured. In addition, based on the results of the tensile test, the toughness expressed as an area of the stress-strain curve can be obtained.

EXAMPLES

Next, the embodiments of the disclosure will be described in more detail with reference to examples, but the disclosure is not limited to these examples.

Example 1

Preparation of a Complex Formed of Sodium Lignin Sulfonate and ε-PL 5 g of sodium lignin sulfonate (commercially available from Tokyo Chemical Industry Co., Ltd.) powder, ε-PL solution (commercially available from JNC, 25 to 35-mers, Lot No. 2160204, 25 weight % aqueous solution) 20 mL, and 4 mL of pure water were uniformly mixed. The mixture was transferred to a Petri dish made of a fluorine resin, the solvent was volatilized, and thereby a sheet-like complex with a thickness of 1 mm or more was obtained. The picture of the obtained complex is shown in FIG. 1.

Example 2

Preparation of a Complex by Changing a Ratio Between Sodium Lignin Sulfonate and ε-PL The sodium lignin sulfonate used in Example 1 and the ε-PL solution were uniformly mixed at the ratios shown in Table 1. The mixture was transferred to a Petri dish made of a fluorine resin, the solvent was volatilized, and thereby a complex was prepared. In this example, in all compositions shown in Table 1, sheet-like complexes were obtained in the same manner as in Example 1.

TABLE 1

|  | Sample 1 | Sample 2 | Sample 3 | Sample 4 | Sample 5 |
| --- | --- | --- | --- | --- | --- |
| Sodium lignin sulfonate (powder) | 3.3 g | 4 g | 5 g | 6 g | 6.7 g |
| ε-PL solution | 26.7 mL | 24 mL | 20 mL | 16 mL | 13.3 mL |
| Pure water | 0 mL | 0 mL | 4 mL | 8 mL | 10.7 mL |
| Content of water after equilibration (30° C., humidity of 50%, for 5 days) | 15.1 weight % | 13.7 weight % | 12.2 weight % | 11.6 weight % | 12.1 weight % |

Example 3

Preparation of a Complex Formed of Sodium Lignin Sulfonate According to a Re-Precipitation Method Using an Organic Solvent and ε-PL A solution obtained by mixing the sodium lignin sulfonate used in Example 1 and an ε-PL solution was added dropwise to 20 times the amount of acetone. The precipitate was collected by centrifugation (3,500 g, 2 minutes), transferred to a Petri dish made of a fluorine resin, and then heated on a hot plate at 150° C., the solvent was removed, and thereby a sheet-like complex was obtained in the same manner as in Example 1. The appearance of the obtained complex was almost the same as that of the complex obtained in Example 1.

Example 4

Preparation of a Complex Formed of an Aqueous Solution Containing Sodium Lignin Sulfonate and ε-PL The sodium lignin sulfonate used in Example 1 was dissolved in water to prepare a 40 weight % aqueous solution. 1.6 parts by weight of the ε-PL solution used in Example 1 was uniformly mixed with 1 part by weight of the aqueous solution containing sodium lignin sulfonate, and the solvent in the obtained mixture was volatilized on a Petri dish made of a fluorine resin, and thereby a sheet-like complex was obtained in the same manner as in Example 1. The appearance of the obtained complex was almost the same as that of the complex obtained in Example 1.

Example 5

Preparation of a Complex Formed of San X P252 (Sodium Lignin Sulfonate, Commercially Available from Nippon Paper Industries Co., Ltd.) and ε-PL 1 part by weight of a 40 weight % aqueous solution containing San X P252 (sodium lignin sulfonate, commercially available from Nippon Paper Industries Co., Ltd.) and 1.6 parts by weight of the ε-PL solution used in Example 1 were uniformly mixed. The mixture was transferred to a Petri dish made of a fluorine resin, the solvent was volatilized, and thereby a sheet-like complex was obtained in the same manner as in Example 1. The appearance of the obtained complex was almost the same as that of the complex obtained in Example 1.

Example 6

Preparation of a Complex Formed of San X P202 (Calcium Lignin Sulfonate, Commercially Available from Nippon Paper Industries Co., Ltd.) and ε-PL The same operations as in Example 5 were performed using a 40 weight % aqueous solution containing San X P202 (calcium lignin sulfonate, commercially available from Nippon Paper Industries Co., Ltd.) and the ε-PL solution used in Example 1, and thereby a sheet-like complex was obtained in the same manner as in Example 1. The appearance of the obtained complex was almost the same as that of the complex obtained in Example 1.

Example 7

Preparation of a Complex Formed of San X P321 (Lignin Sulfonic Acid Magnesium Salt, Commercially Available from Nippon Paper Industries Co., Ltd.) and ε-PL The same operations as in Example 5 were performed using a 40 weight % aqueous solution containing San X P321 (lignin sulfonic acid magnesium salt, commercially available from Nippon Paper Industries Co., Ltd.) and the ε-PL solution used in Example 1, and thereby a sheet-like complex was obtained in the same manner as in Example 1. The appearance of the obtained complex was almost the same as that of the complex obtained in Example 1.

Example 8

Preparation of a Complex Formed of Pearllex NP (Sodium Lignin Sulfonate with a High Purity and High Molecular Weight, Commercially Available from Nippon Paper Industries Co., Ltd.) and ε-PL 1 part by weight of a 25 weight % aqueous solution containing PearllexNP (sodium lignin sulfonate with a high purity and high molecular weight, commercially available from Nippon Paper Industries Co., Ltd.) and 1 part by weight of the ε-PL solution used in Example 1 were uniformly mixed, the same operations as in Example 5 were performed, and thereby a sheet-like complex was obtained in the same manner as in Example 1. The appearance of the obtained complex was almost the same as that of the complex obtained in Example 1.

Example 9 Preparation of a Complex Formed of Pearllex DP (Modified Sodium Lignin Sulfonate with a High Purity, Commercially Available from Nippon Paper Industries Co., Ltd.) and ε-PL 1 part by weight of a 25 weight % aqueous solution containing Pearllex DP (modified sodium lignin sulfonate with a high purity, commercially available from Nippon Paper Industries Co., Ltd.) and 1 part by weight of the ε-PL solution used in Example 1 were uniformly mixed, the same operations as in Example 5 were performed, and thereby a sheet-like complex was obtained in the same manner as in Example 1. The appearance of the obtained complex was almost the same as that of the complex obtained in Example 1.

Example 10

Preparation of a Complex Formed of Vanillex RN (Partially Desulfurized Sodium Lignin Sulfonate with a High Purity, Commercially Available from Nippon Paper Industries Co., Ltd.) and ε-PL 1 part by weight of a 20 weight % aqueous solution containing Vanillex RN (partially desulfurized sodium lignin sulfonate with a high purity, commercially available from Nippon Paper Industries Co., Ltd.) and 0.8 parts by weight of the ε-PL solution used in Example 1 were uniformly mixed, the same operations as in Example 5 were performed, and thereby a sheet-like complex was obtained in the same manner as in Example 1. The appearance of the obtained complex was almost the same as that of the complex obtained in Example 1.

Example 11

Preparation of a Complex Formed of Sodium Lignin Sulfonate and an ε-PL Hydrochloride Salt 50 mL of the ε-PL solution used in Example 1 and 19.5 mL of hydrochloric acid (5 mol/L aqueous solution) were mixed to prepare an ε-PL hydrochloride solution. 27.8 mL of the ε-PL hydrochloride solution and 5 g of sodium lignin sulfonate powder used in Example 1 were uniformly mixed. The mixture was transferred to a Petri dish made of a fluorine resin, the solvent was volatilized, and thereby a sheet-like complex was obtained in the same manner as in Example 1. The appearance of the obtained complex was almost the same as that of the complex obtained in Example 1.

Comparative Example 1

Preparation of Sample Formed of ε-PL

The solvent in only the ε-PL solution used in Example 1 was volatilized on a Petri dish made of a fluorine resin, and thereby a sample was prepared. The obtained sample was brittle, and cracked when it was removed from the Petri dish made of a fluorine resin, and it was not possible to obtain a sheet-like sample maintaining the shape during casting.

Example 12

Tensile Test for a Complex Formed of Sodium Lignin Sulfonate and ε-PL

A dumbbell-like test piece (No. 8, JIS K 6251) was cut out from the sheet-like complex prepared in Example 1. The length of the test piece in the major axis direction was 5 cm. The test piece was equilibrated at 30° C. and a relative humidity of 50% for 5 days, and the tensile test (in air, a tensile speed of 50 mm/min) was then performed. The results of the tensile test are shown in Table 2 (average value of 3 tests).

TABLE 2

| Maximum stress (MPa) | Elongation at break (%) | Young's modulus (MPa) | Toughness (MJ/m$^3$) |
|---|---|---|---|
| 12.9 ± 0.9 | 75 ± 4 | 556 ± 50 | 8.8 ± 0.9 |

Comparative Example 2

Tensile Test for a Complex Formed of Sodium Lignin Sulfonate and Poly(Diallyldimethylammonium Chloride)

According to the description in Patent Document 3, a ratio between sodium lignin sulfonate and poly(diallyldimethylammonium chloride) were changed to prepare a sheet-like ionic complex. A dumbbell-like test piece (No. 8, JIS K 6251) was cut out from the complex. The test piece was equilibrated at 30° C. and a relative humidity of 50% for 5 days, and the tensile test (in air, a tensile speed of 50 mm/min) was then performed according to the tensile test method described in Example 12. The results of the tensile test are shown in Table 3.

The largest values of the strength and toughness of the complexes formed of sodium lignin sulfonate and poly (diallyldimethylammonium chloride) were 4.1 MPa, and 3.6 MJ/m$^3$, and the strength and toughness of the complex formed of sodium lignin sulfonate and ε-PL as shown in Example 12 were 12.9 MPa, and 8.8 MJ/m$^3$ which were 3.1 times or more and 2.4 times or more the above values.

These results and the results of Example 12 show that, when ε-PL was used as a cationic polymer, the maximum strength and toughness of the ionic complex were apparently improved compared to when a cationic polymer other than ε-PL was used.

TABLE 3

| Sodium lignin sulfonate (weight proportion) | Poly(diallyldi-methylammonium chloride) (weight proportion) | Stress at break (MPa) | Elongation at break (%) | Toughness (MJ/m$^3$) |
|---|---|---|---|---|
| 67 | 33 | 3.0 ± 0.5 | 2 ± 1 | 0.04 ± 0.01 |
| 60 | 40 | 4.1 ± 0.2 | 20 ± 4 | 0.7 ± 0.2 |
| 50 | 50 | 2.8 ± 0.1 | 142 ± 10 | 3.4 ± 0.3 |
| 40 | 60 | 2.7 ± 0.2 | 174 ± 15 | 3.6 ± 0.1 |
| 33 | 67 | 3.1 ± 0.1 | 128 ± 5 | 3.3 ± 0.3 |
| 25 | 75 | 3.1 ± 0.1 | 122 ± 10 | 3.1 ± 0.4 |
| 13 | 87 | 3.0 ± 0.2 | 101 ± 17 | 2.4 ± 0.5 |
| 0 | 100 | 3.3 ± 0.2 | 71 ± 10 | 1.8 ± 0.4 |

Example 13

Figure 2:
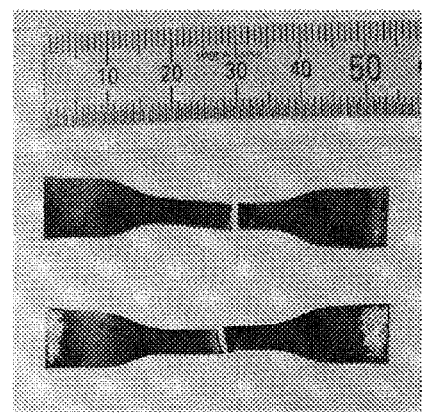
FIG. 2 shows a picture of results of evaluation of elasticity of a complex formed of sodium lignin sulfonate and ε-PL.

Evaluation of Elasticity of a Complex Formed of Sodium Lignin Sulfonate and ε-PL The picture of the sample broken in the test that was left in air for 30 minutes after the tensile test was performed in Example 12 is shown in FIG. 2. As shown in Example 12, despite the fact that about a strain of 80% (4 cm) was applied to the dumbbell test piece with a length of 5 cm before the test immediately before breaking, the amount of deformation after being left was 10% (5 mm) or less, and the shape spontaneously recovered to almost the same length as the sample before the tensile test, which indicates that this complex had elasticity.

Example 14

Self-Healing Test for a Complex Formed of Sodium Lignin Sulfonate and ε-PL

Figure 3:
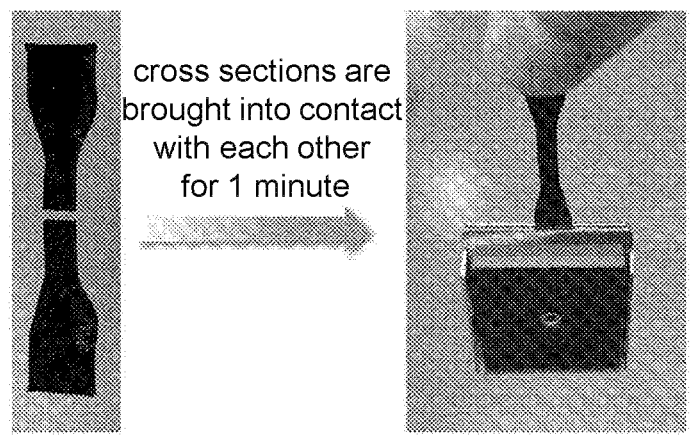
FIG. 3 shows the picture of results of a self-healing test for a complex formed of sodium lignin sulfonate and ε-PL.

A dumbbell-like test piece (No. 8, JIS K 6251) was cut out from the sheet-like complex prepared in Example 1. The center (a part 2.5 cm from the end) of the obtained test piece was cut with a razor, and the cut cross sections of the test piece were brought into contact with each other at room temperature for 1 minute. FIG. 3 shows the picture of the test piece immediately after cutting and the picture of the result in which one side of a test piece with cut surfaces that were brought into contact with each other for 1 minute was held by being inserted into an approximately 45 g magnet clip. It is shown that, although the dumbbell-like test piece was completely cut, the strength recovered to such an extent that it was possible to hold the magnet clip due to contact between cross sections.

The ionic composite material according to the embodiments of the disclosure can be molded into various shapes, and has high elasticity, and an excellent self-healing ability and biodegradability, and thus can be used for materials for molded products of various applications for which such characteristics are required.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An ionic composite material comprising lignin sulfonic acid, its derivatives, or its salts, and ε-polylysine, its derivatives, or its salts, wherein a proportion of a total amount of lignin sulfonic acid, its derivatives or its salts and ε-polylysine, its derivatives or its salts in the entire ionic composite material is 50 to 97 weight %, and the content of water is 3 to 50 weight % of the entire ionic composite material.

2. The ionic composite material according to claim 1, wherein the ionic composite material has elasticity.

3. The ionic composite material according to claim 1, wherein the ionic composite material has a self-healing ability.

4. The ionic composite material according to claim 1, wherein a salt of lignin sulfonic acid or a derivative thereof is a metal salt.

5. The ionic composite material according to claim 4, wherein the metal salt is selected from the group consisting of sodium salts, calcium salts, and magnesium salts.

6. The ionic composite material according to claim 1, wherein the ε-polylysine has a weight average molecular weight of 500 to 1,000,000.

7. The ionic composite material according to claim 1, wherein the ionic composite material has a sheet form with a thickness of 1 to 10 mm.

8. A method of producing the ionic composite material according to claim 1, the method comprising:
a process of mixing lignin sulfonic acid, its derivatives, or its salts, and ε-polylysine, its derivatives, or its salts into a solvent to form an ionic complex in the solvent; and
a process of removing the solvent from a solution or suspension containing the ionic complex.

9. The method according to claim 8, wherein the process of forming the ionic complex is performed by mixing a solution containing lignin sulfonic acid, its derivatives, or its salts and a solution containing ε-polylysine, its derivatives, or its salts.

10. The method according to claim 8, wherein the process of removing the solvent is performed by volatilizing the solvent from the solution or suspension containing the ionic complex.

11. The method according to claim 8, wherein the solvent is water.

12. The method according to claim 11, wherein the process of removing the solvent is performed by introducing the solution or suspension containing the ionic complex into an organic solvent.

* * * * *